UNITED STATES PATENT OFFICE.

EDWIN LEHMAN JOHNSON, OF MEMPHIS, TENNESSEE.

PROCESS OF EXTRACTING COTTON-SEED OIL.

SPECIFICATION forming part of Letters Patent No. 691,342, dated January 14, 1902.

Application filed September 16, 1895. Renewed June 25, 1901. Serial No. 65,982. (No specimens.)

*To all whom it may concern:*

Be it known that I, EDWIN LEHMAN JOHNSON, a citizen of the United States of America, residing at Memphis, Shelby county, Tennessee, have invented a certain new and useful Improvement in the Process of Manufacturing Cotton-Oil, of which the following is a specification.

My invention consists, essentially, in mixing with a mass of cotton-seed kernels a limited quantity of cotton-seed bran sufficient to make the mass porous, so that it shall yield up the oil readily when pressed.

In the manufacture of cotton-seed oil two general methods have been adopted. One is to hull the cotton-seed, cook the kernels in a heater, draw off the heated mass into a former, where the mass is formed into cakes, and then subject these cakes to hydraulic pressure to press out the oil. This gives a good quality of oil, but leaves a considerable proportion of the oil in the cake. This is the method usually practiced in this country. The other method, which is usually practiced in England, is to roll the entire seed without separating the hull from the kernel and otherwise treat them as above stated. This gives an inferior quality of oil, because the presence of the hulls in the mass while it is being cooked is detrimental. The hulls are about half of the mass.

I have discovered that by introducing a proper limited proportion of the bran after the mass of kernels is cooked a larger yield of oil is secured without in any way diminishing the quality. In the first method described above it is a rare exception for the cake to retain less than eight per cent. of the oil, while it frequently runs as high as fifteen to eighteen per cent., and the general average by this process in mills in the United States at the present time is about twelve and one-half per cent. I have never found more than eight per cent. of oil left in the cake by my process. I have found it to run as low as six and four-tenths per cent. and believe that under more suitable conditions the test will not exceed more than five per cent. of oil left in the cake.

In my process I hull the seed, separate the kernels as in the first process above stated, and then either add and mix in the cotton-seed bran before or after rolling and before cooking or add and mix in the bran in the heater when the meats are almost or quite cooked. The first of these processes is the more convenient and preferable when the quality of oil is not of so much importance; but the second, where the bran is added after the cooking is nearly or quite complete, gives a better quality of oil, for the coloring-matter in the cotton-seed bran is not then cooked or steamed out, nor is it liberated in the oil by pressure, as is very apt to be the case when the bran is added before cooking. When the kernels are cooked and the mass is about to be carried into the former, I add to the mass of kernels cotton-seed bran to the amount of about ten per cent., by weight, and thoroughly mix the bran throughout the mass of kernels. This requires only a few moments, and before the kernels have time to produce any effect on the character of the oil I remove the mass from the heater and form it into cakes and press it, as before explained. I obtain thereby, with no more pressure than is usually applied, about one and one-half per cent. more of oil, and the oil is of as good a quality as by the present process. Another advantage of my method, however, is that the bran gives a greater consistency to the cake than when only the kernels are used. The result is that when pressure is applied there is not the same strain upon the press-cloths and these are less rapidly destroyed. Furthermore, I am enabled to use higher pressure than economy of press-cloths at present admits of, and therefore obtain a larger increase in the oil than above stated.

While I do not limit myself to any theory upon which to explain this operation, I believe the fact to be that the larger yield of oil is due to the increased porosity of the cake, which results from mixing the bran with the kernels. In the second or English method above explained there is an increased porosity; but the bran itself absorbs and retains a considerable quantity of oil. With as much as fifty per cent. of bran present in the mass the absorption by the bran offsets the advantage which would otherwise arise from increased porosity in the mass; but by limiting the quantity of bran an increased yield is obtained, and by adding the bran just before the mass is removed from the heater to the former the deterioration of the oil is prevented.

The quantity of cotton-seed bran which I must use runs from two and one-half to thirty per cent. A larger quantity than thirty per cent. offsets the advantage of using bran by its own absorption of oil, and a smaller quantity of two and one-half per cent. produces no appreciable increase in the yield of oil; but, while stating these limits within which my process is practicable, as a matter of fact I find it generally desirable to use about ten per cent., as stated. I do not wish to limit myself to this proportion, however, strictly, because the conditions existing at various seasons and at different points of manufacture—as, for instance, the relative price of oil and cake, the use to which the oil and cake are to be put, and the market demand—vary so much from time to time and place to place that it may be desirable to depart somewhat widely from the ten per cent. which I prefer to use.

Cotton-seed bran is the dark solid portion of the hull of the cotton-seed from which the short cotton fiber has been removed and is already upon the market as an article of commerce.

I do not in those claims in which no percentage of cotton-seed bran is definitely stated limit myself to the preferred percentage of ten per cent. thereof, as such percentage is not necessary, and my invention includes the use of the bran within the broader proportions hereinbefore stated.

Without limiting myself to the precise details shown, what I claim, and desire to secure by Letters Patent of the United States, is—

1. In the method of manufacturing cotton-oil which consists in adding to cotton-seed kernels cotton-seed bran in substantially the proportions specified, mixing the two together, and pressing and forming the cake, substantially as described.

2. The method of manufacturing cotton-oil which consists in adding to cotton-seed kernels cotton-seed bran in substantially the proportions specified, mixing these together; and forming and pressing the cake, substantially as described.

3. The method of manufacturing cotton-oil which consists in cooking the cotton-seed kernels, and then mixing therewith cotton-seed bran and forming and pressing the cake while it is still hot, substantially as described.

4. The method of manufacturing cotton-seed oil which consists in mixing with a mass of the kernels about ten per cent. by weight of cotton-seed bran and forming and pressing the cake, substantially as described.

5. The method of manufacturing cotton-seed oil which consists in cooking the kernels, mixing with the mass of kernels about ten per cent. of cotton-seed bran and forming and pressing the cake, substantially as described.

Signed by me in New York city this 30th day of August, 1895.

EDWIN LEHMAN JOHNSON.

Witnesses:
SAMUEL W. BALCH,
CHAS. F. BISHOP.